(12) United States Patent
Zieles et al.

(10) Patent No.: US 6,932,743 B2
(45) Date of Patent: Aug. 23, 2005

(54) THROTTLE CONTROL AND FAILURE ACCOMMODATION

(75) Inventors: Michael D. Zieles, Columbus, IN (US); Stephanie L. Goerges, Franklin, IN (US); Jason R. Lowery, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 10/627,051

(22) Filed: Jul. 25, 2003

(65) Prior Publication Data

US 2005/0079953 A1 Apr. 14, 2005

Related U.S. Application Data

(60) Provisional application No. 60/399,001, filed on Jul. 27, 2002.

(51) Int. Cl.[7] .................. B60K 41/20; F02D 11/10; F02D 41/22
(52) U.S. Cl. .................. 477/187; 477/203; 477/906; 123/479
(58) Field of Search .................. 477/183, 187, 477/203, 205, 206, 906; 123/369–399, 479

(56) References Cited

U.S. PATENT DOCUMENTS

| | | | |
|---|---|---|---|
| 4,833,613 A | 5/1989 | Mack et al. | |
| 4,887,491 A | 12/1989 | Holbrook et al. | |
| 4,922,425 A | 5/1990 | Mack et al. | |
| 4,975,844 A * | 12/1990 | Holbrook et al. | 701/63 |
| 5,056,022 A | 10/1991 | Witkowski et al. | |
| 5,109,721 A | 5/1992 | Boardman et al. | |
| 5,268,842 A | 12/1993 | Marston et al. | |
| 5,305,215 A | 4/1994 | Brekkestran et al. | |
| 5,406,483 A | 4/1995 | Kallis et al. | |
| 5,429,092 A * | 7/1995 | Kamei | 123/399 |
| 5,626,120 A | 5/1997 | Akalsuka | |
| 5,629,852 A | 5/1997 | Yokoyama et al. | |
| 5,685,268 A | 11/1997 | Wakemen | |
| 5,937,826 A | 8/1999 | Olson et al. | |
| 5,983,859 A * | 11/1999 | Bruedigam et al. | 123/396 |
| 6,053,147 A | 4/2000 | Hemmerlein et al. | |
| 6,076,504 A | 6/2000 | Stavnheim et al. | |
| 6,116,214 A * | 9/2000 | Ishida | 123/399 |
| 6,209,518 B1 * | 4/2001 | Machida et al. | 123/396 |
| 6,253,136 B1 | 6/2001 | Stratton et al. | |
| 6,276,331 B1 * | 8/2001 | Machida et al. | 123/396 |
| 6,293,251 B1 | 9/2001 | Hemmerlein et al. | |

* cited by examiner

Primary Examiner—Richard M. Lorence
(74) Attorney, Agent, or Firm—Barnes & Thornburg

(57) ABSTRACT

One embodiment of the present invention is an apparatus including an internal combustion engine for powering a ground travelling vehicle, a throttle control arrangement including a device for sensing position of an operator-adjustable pedal to provide a throttle control signal, a first sensor to sense rotational speed of the engine, a second sensor to sense brake status of the vehicle, a way to determine failure of the throttle control signal, and a way to operate the engine in a limp-home mode in response to the failure, which includes fueling the engine during the limp-home mode of operation in accordance with idle position of the pedal, rotational speed of the engine, and the brake status.

26 Claims, 10 Drawing Sheets

THROTTLE CONTROL AND FAILURE ACCOMMODATION

RELATED APPLICATIONS

The present application claims the benefit of U.S. Provisional Patent Application No. 60/399,001 filed Jul. 27, 2002, and entitled THROTTLE CONTROL AND FAILURE ACCOMMODATION. The provisional patent application is incorporated herein by reference.

BACKGROUND

The present invention relates to internal combustion engines, and more particularly, but not exclusively, is directed to sensor signal processing for throttle control of an engine.

With the advent of electronic control systems, sensors are frequently used to receive input of various parameters. When a sensor fails, it is also frequently desirable to adjust the control system to accommodate for this failure in some manner. More particularly, there is an interest in sensing position of operator-adjustable controls, such as a throttle input, and accommodating failures of corresponding sensors. Thus, an ongoing need exists for further contributions in this area of technology.

SUMMARY

One embodiment of the present invention is a unique technique for controlling an internal combustion engine. Other embodiments include unique methods, systems, apparatus, and devices for processing sensor signals relating to throttle control of an engine.

Yet other embodiments include unique methods, systems, and apparatus to accommodate a throttle control failure. In one form, a unique limp-home mode of engine operation is provided through the failure accommodation.

Still other embodiments include unique throttle control sensing methods, systems, and apparatus. These embodiments are directed to throttle control arrangement with two or more sensors each operable to detect a range of nonidle throttle control positions.

A further embodiment includes an internal combustion engine; a throttle control arrangement including an operator adjustable pedal and a set of sensors each operable to sense at least a portion of a range of multiple nonidle positions of the pedal; and a controller responsive to the throttle control arrangement to generate one or more throttle signals. In one form, the controller includes operating logic to do one or more of the following: detect an out-of-range condition of one or more of the sensors, detect a conformance error of one sensor relative to another, determine throttle idle status form the sensors, determine one or more parameters to calibrate the sensor outputs, accounting for manufacturing variation and/or sensor drift.

Yet a further embodiment includes: operating an internal combustion engine fueled in accordance with an operator-adjusted throttle control; registering at least a portion of a range of multiple nonidle positions of the operator-adjusted throttle control with each of two or more sensors; detecting an out-of-range condition of one or more of the sensors; determining an error based on a difference in output between at least two of the sensors; determining idle status from the sensors; and/or adjusting the sensor outputs to account for sensor drift and/or an expected range of manufacturing variation.

Another embodiment includes operating an internal combustion engine in response to a throttle signal provided with an operator-adjusted throttle control; generating an idle status signal corresponding to an idle position of this control; detecting a failure; and adjusting fuel provided to the engine as a function of the idle status signal. In one form, this adjustment may further be determined as a function of rotational engine speed and braking status of a vehicle powered by the engine.

Still another embodiment includes moving a ground-traveling vehicle with an internal combustion engine in response to a first operator-adjusted fueling control; detecting a failure of this control; adjusting operation of the engine in response to it to limit vehicle speed after the failure; and operating the engine after the failure in response to a second operator-adjusted fueling control to selectively move the vehicle at a greater speed than permitted with the first operator-adjusted fuel control.

Yet another embodiment includes a ground-traveling vehicle; an internal combustion engine operable to power motion of the vehicle; a throttle control responsive to an operator of the vehicle; a cruise control responsive to the operator of the vehicle; a vehicle speed sensor; and a controller. This controller responds to the throttle control to regulate fueling of the engine and is operable to detect a throttle control failure and regulate engine operation with the throttle control in an accommodation mode in response to the failure. The controller is responsive to operator input with the cruise control and the vehicle speed sensor to permit the engine to power the vehicle at a vehicle speed greater than with the throttle control during engine operation in the accommodation mode.

A further embodiment includes operating a vehicle including an internal combustion engine fueled in accordance with an operator-adjusted fueling control; registering at least a portion of a range of multiple nonidle positions of the operator-adjusted throttle control with each of two or more sensors; detecting a failure of one of the sensors; determining idle status of the throttle control after the failure; and fueling the engine based on a limp-home mode of operation in accordance with the idle status.

Another embodiment includes an internal combustion engine; a throttle control arrangement, including an operator-adjustable pedal and a set of sensors to redundantly sense at least a portion of a range of multiple nonidle positions of the pedal; and a controller responsive to the set of sensors to determine an engine fueling signal corresponding to the position of the pedal and an idle status signal representative of idle position status of the pedal. The controller is operable to detect failure of the throttle control arrangement and control the engine in a failure accommodation mode. The controller generates the engine fueling signal as a function of the idle status signal during the failure accommodation mode.

Accordingly, it is one object of the present invention to provide a unique technique for controlling an internal combustion engine.

Another object of the present invention is to provide a unique method, system, apparatus, or device for processing sensor signals relating to throttle control of an engine.

Further embodiments, forms, features, objects, advantages, benefits, and aspects of the present invention shall become apparent from the detailed description and drawings provided herewith.

DETAILED DESCRIPTION

Figure 1:
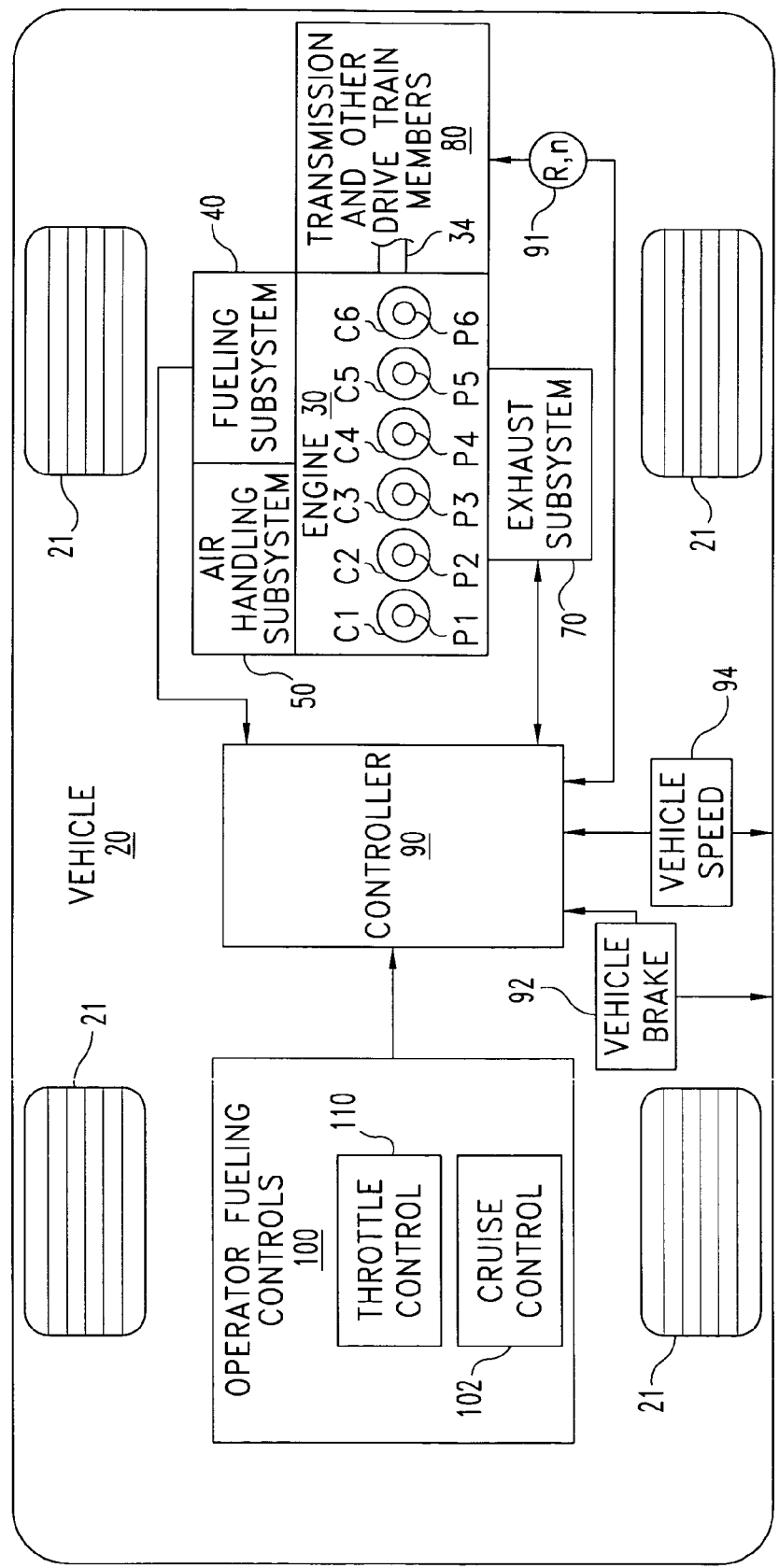
FIG. 1 is a diagrammatic view of a vehicle and engine system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 depicts vehicle 20 of one embodiment of the present invention. As depicted, vehicle 20 includes wheels 21 to travel along the ground, and may be of any type, such as a pick-up truck, a heavy duty truck, a passenger car or van, or an off-road variety to name just a few. Vehicle 20 includes engine 30 with a number of cylinders C1–C6 each having a corresponding reciprocating piston P1–P6 that is rotatably coupled to crankshaft 34 in a conventional manner. Each cylinder/piston pair corresponds to a combustion chamber configured to receive a combustible air/fuel charge. Engine 30 is of a four cycle type with noncontinuous combustion in each cylinder C1–C6 intermittently contributing power in accordance with a timed sequence of fueling and ignition operations. In lieu of a reciprocating piston-based engine, a rotor-based engine may be utilized in an alternative embodiment of the present invention. Engine 30 is configured to operate with a diesel fuel supplied from fuel source that is injected with injectors, (now shown), and is correspondingly of the Compression Ignition (CI) variety. In one application, engine 30 is a diesel-fueled, in-line six cylinder engine utilized with a light duty truck form of vehicle 20; however, other embodiments may have more or fewer cylinders in any geometric arrangement; may operate over a different number of cycles, such as a two cycle type; may have different fueling and/or may be of a different vehicle type, to name only a few possible variations. In a further example, engine 30 could be configured for other fuel types as an alternative or in addition to diesel such as gasoline, alcohol, a gaseous fuel (a "gaseous fuel" refers to a fuel which is in the gaseous state when contained at standard temperature and pressure), a combination of these, or a different fuel as would occur to those skilled in the art. Correspondingly, engine 30 can be of a different ignition type, such as a Spark Ignition (SI) variety.

Crankshaft 34 is connected to a transmission and other drive train members 80 in a conventional manner. The transmission may be of an automatic, manual, semi-manual, or different type as would occur to those skilled in the art. Transmission and other drive train members 80 operate to move vehicle 20 with mechanical power provided by crankshaft 34.

Engine 20 also includes fueling subsystem 40. Subsystem 40 includes a fuel source operatively coupled to a fueling conduit that is in fluid communication with a fuel rail to selectively supply fuel to the injectors (not shown) associated with each cylinder C1–C6. Fueling with injectors may be by port injection, direct injection, or using such other injection techniques as would occur to those skilled in the art. In other embodiments, fueling may be provided in a different manner with or without injectors as appropriate to the arrangement.

Air is supplied to cylinders C1–C6 via air handling subsystem 50. Air handling subsystem 50 includes a throttle valve positioned therealong to control air flow through a conduit to an intake manifold. Air from the intake manifold is mixed with fuel from the injectors to selectively provide a combustible charge in each of cylinders C1–C6. Engine 30 also includes exhaust subsystem 70. Exhaust from engine 30 exits along exhaust subsystem 70 through a conduit in a standard manner.

The air handling subsystem 50 and exhaust system 70 may include components of a turbocharger (not shown) including a compressor which draws air through an inlet into a conduit of subsystem 50. Subsystem 50 may further include an aftercooler to cool air compressed by this compressor. For a turbocharger embodiment, exhaust subsystem 70 can include a turbine powered by the exhaust stream to drive the compressor, and further may have a wastegate to selectively by-pass exhaust away from the turbine.

Vehicle 20 further includes controller 90 operatively coupled to air handling subsystem 50, fueling subsystem 40, exhaust subsystem 70, and operator fueling controls 100. Fueling controls 100 directly or indirectly change the amount of fuel provided to engine 30 in response to movement by an operator. Included in fueling controls 100 are cruise control 102 and throttle control 110. Throttle control 110 may be any of a variety of different types including, but not limited to, one of the throttle control arrangements described in connection with FIG. 6 or FIG. 7 hereinafter. Similarly, cruise control 102 may be any of a variety of operator-manipulated devices to set and/or adjust speed of a vehicle—typically in a cruising speed range.

Controller 90 is also coupled to rotation sensor 91 which is configured to supply signal R indicative of rotation of crankshaft 34. Preferably, signal R provides conventional crank angle information about engine 30 which may be utilized for timing operation of engine 30. Rotational engine speed, designated as signal n, is determined from signal R in a conventional manner. In one embodiment, signal R corresponds to a pulse train, the frequency of which is directly proportional to the rotational speed of engine 30. Signal n may then be provided by monitoring the pulse train frequency. U.S. Pat. No. 5,165,271 to Stepper et al.; U.S. Pat. No. 5,460,134 to Ott et al.; and U.S. Pat. No. 5,469,823 to Ott et al. are representative of an arrangement suitable for providing signals R and n. In other embodiments, signal n may be determined directly from a rotational speed sensing arrangement or in a different manner.

Controller 90 is further operatively coupled to vehicle brake sensor 92 and vehicle speed sensor 94. Vehicle brake sensor 92 provides signal information that can be used to determine whether a vehicle brake is being applied. Vehicle speed sensor 94 provides signal information that can be used to determine the speed of vehicle 20. Sensors 91, 92, 94 can be any of a number of sensors and/or sensing subsystems known in the art, and may provide a signal in either a digital or analog format compatible with associated equipment. Correspondingly, equipment coupled to each sensor is configured to condition and convert sensor signals to the appropriate format, as required. Additionally, controller 90 may be operatively coupled to a number of other devices and/or subsystems of vehicle 20 and/or engine 30; for example: a temperature sensor to provide engine temperature signal information, a pressure sensor to provide intake manifold pressure signal information, an exhaust gas oxygen sensor, an electrical power generation subsystem, and/or operator compartment subsystem(s), to name just a few.

Controller 90 may be comprised of digital circuitry; analog circuitry; optical devices; pneumatic, hydraulic, or other mechanical devices, or a combination of these. Also, controller 90 may be programmable, a dedicated state machine, or a hybrid combination of programmable and dedicated hardware. Controller 90 can be an electronic circuit comprised of one or more components that are assembled as a common unit. Alternatively, for a multiple component embodiment, one or more of these components may be distributed throughout the relevant system. Controller 90 operates in accordance with operating logic to implement various aspects of the inventions described hereinafter in connection with FIGS. 2–11. This operating logic may be hardwired and/or provided by programming. In one embodiment, controller 90 includes an integrated processing unit operatively coupled to one or more solid-state memory devices that at least partially include the operating logic in the form of program instructions executed by the processing unit. In this embodiment, the controller and supporting components are provided in a common unit in the form of an Engine Control Module (ECM). Memory for this embodiment may be either volatile or nonvolatile and may additionally or alternatively be of the magnetic, optical, or such other variety as would occur to one skilled in the art. Besides the memory and processing unit, controller 90 can include any control clocks, interfaces, signal conditioners, filters, Analog-to-Digital (A/D) converters, Digital-to-Analog (D/A) converters, communication ports, or other types of operators as would occur to those skilled in the art to implement the principles of the present invention.

Figure 2:
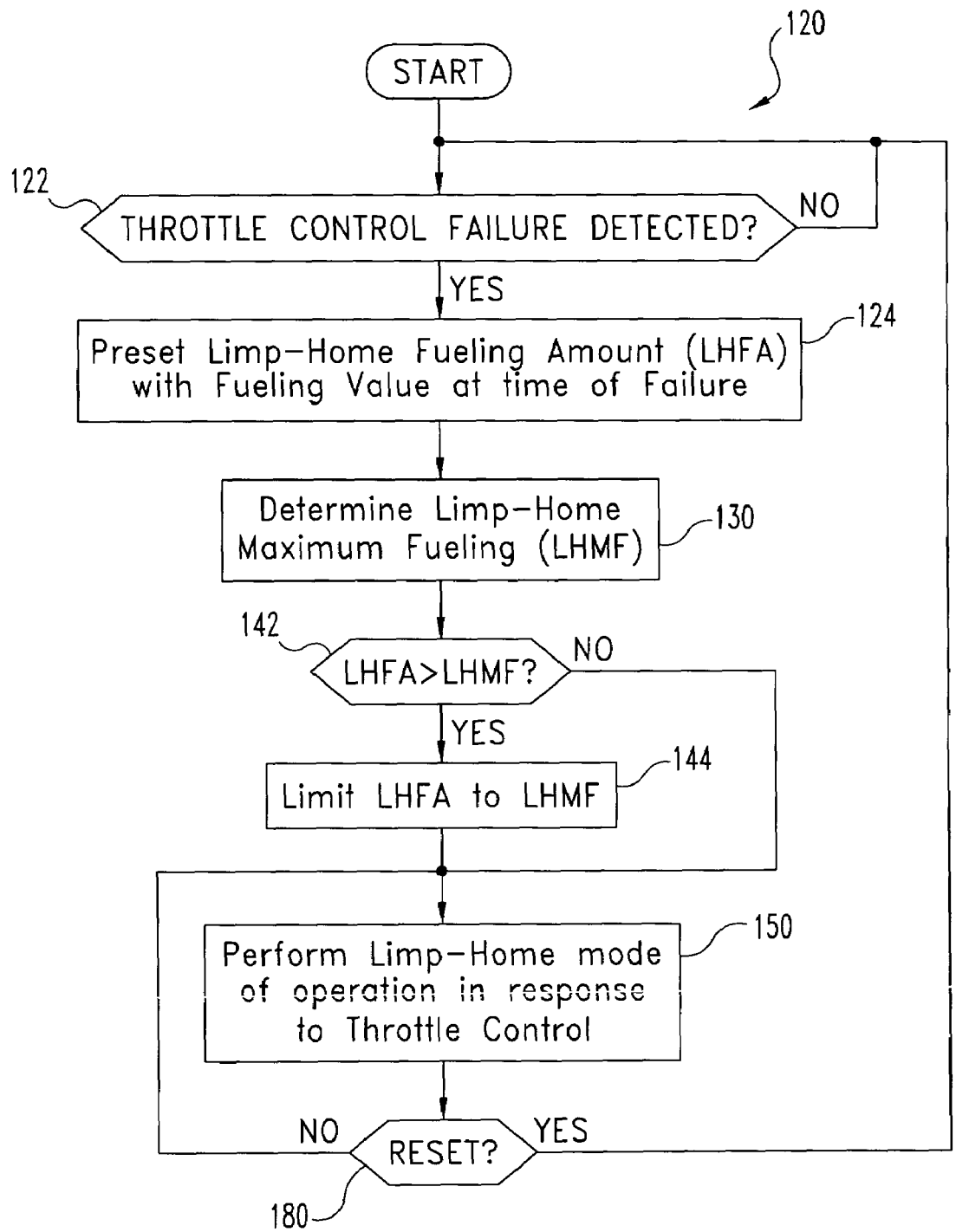
FIGS. 2–4 are flowcharts illustrating a limp-home mode of operation of the system of FIG. 1 to accommodate a throttle-related failure.

FIG. 2 is a flow chart of an embodiment of a limp-home routine 120 for vehicle 20 that may be executed in accordance with the operating logic of controller 90. Routine 120 facilitates operation of vehicle 20 to accommodate a throttle control failure such that a desired destination can be reached prior to repairing the failure. Such destinations could include a repair garage, one's home, a service station, etc. Routine 120 begins with conditional 122 that tests whether a throttle control failure condition exists. If the result of conditional 122 is negative, routine 120 loops back to conditional 122 unless it has an affirmative result. For an affirmative result of conditional 122, routine 120 proceeds to operation 124. Operation 124 assigns the current fueling value of engine 30 to the variable Limp-Home Fueling Amount (LHFA). From operation 124, routine 120 proceeds to subroutine 130 to determine Limp-Home Maximum Fueling (LHMF) as described below.

Figure 3:
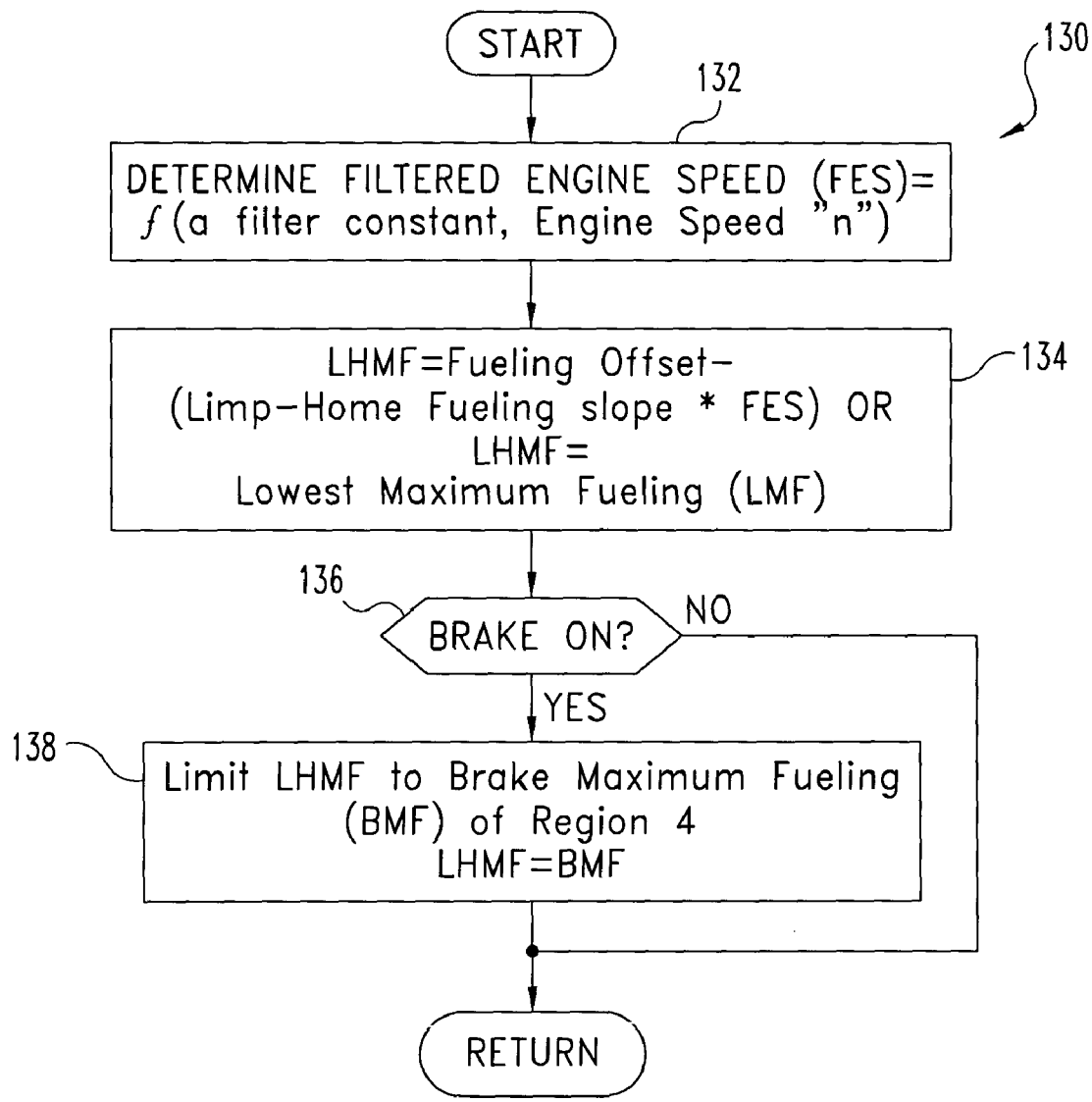

FIG. 3 is a flowchart describing the operation of subroutine 130 that is used to determine the value of LHMF. Routine 130 begins at operation 132 in which Filtered Engine Speed (FES) is determined. FES is provided by a first order digital filter, being determined as a function of a filter constant and engine speed n. Engine speed n may be obtained, for example, using signal information communicated from sensor 91 to controller 90. From operation 132, routine 130 proceeds to operation 134 which sets the value of LHMF in accordance with the graph shown in FIG. 5.

Figure 5:
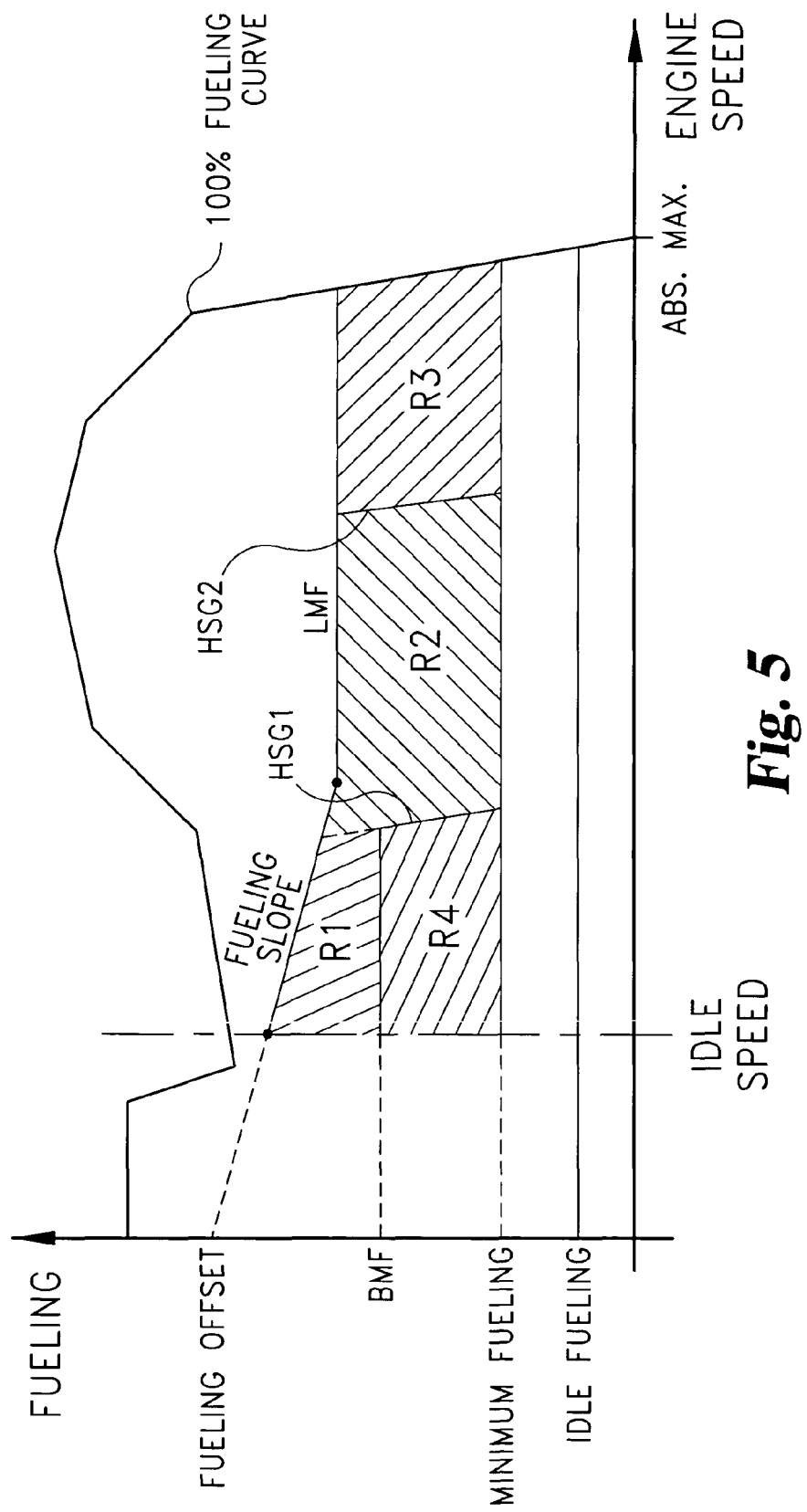
FIG. 5 is a graph of fueling versus engine speed relating to the mode of operation of FIG. 2.

FIG. 5 is a graph showing percent fueling on its vertical axis and engine speed on its horizontal axis. It defines a number of operating regions R1, R2, R3 and R4. A number of fueling values are indicated on the vertical axis: fueling offset, break maximum fueling (BMF), minimum fueling, and idle fueling. The LHMF value is selected from a fueling curve, comprised of two line segments: the fueling slope segment and the generally horizontal line segment labeled LMF (Lowest Maximum Fueling). These two line segments form the upper boundary of operating regions R1, R2 and R3 of the FIG. 5 graph. Idle speed at the left-most extreme of regions on R1 and R4, and absolute maximum engine speed (ABS. MAX.) at the right most extreme region of R3 are found along the horizontal axis. Additionally, regions R1–R4 are shown within a 100% fueling curve that corresponds to nominal fueling limits of engine 30.

Returning to operation 134 of subroutine 130, the criteria for setting LHMF can be understood with reference to the graph of FIG. 5. If FES is of a value that places it in the fueling slope segment of FIG. 5, LHMF is set equal to Fueling Offset—(Limp-Home Fueling Slope*FES). Otherwise, LHMF is set to the Lowest Maximum Fueling (LMF) value, corresponding to the generally horizontal upper boundary of regions R2 and R3 of FIG. 5.

From operation 134, subroutine 130 proceeds to conditional 136 which tests whether the condition "Brake On" is true. Condition "Brake On" may be determined from signal information communicated from vehicle brake sensor 92 to controller 90. If conditional 136 is negative, routine 130 returns to routine 120. If conditional 136 is affirmative, routine 130 proceeds to operation 138 which sets the value of LHMF equal to BMF. This can be understood with reference to the graph of FIG. 5, which shows threshold BMF defining an upper boundary or limit for fueling in region R4. As a result, the maximum fueling during vehicle braking (BMF) is lower than LHMF. From operation 138, subroutine 130 returns to routine 120.

Returning to FIG. 2, routine 120 proceeds from subroutine 130 to conditional 142 which tests whether the value of Limp-Home Fueling Amount (LHFA), as preset in operation 124, is greater than the value of LHMF. If conditional 142 is negative, routine 120 proceeds to subroutine 150 which is described below. If conditional 142 is affirmative, routine 120 proceeds to operation 144. Operation 144 limits the value of LHFA to the value of LHMF. From operation 144, routine 120 enters subroutine 150, which determines subsequent limp-home fueling operations that are described as follows.

Figure 4:
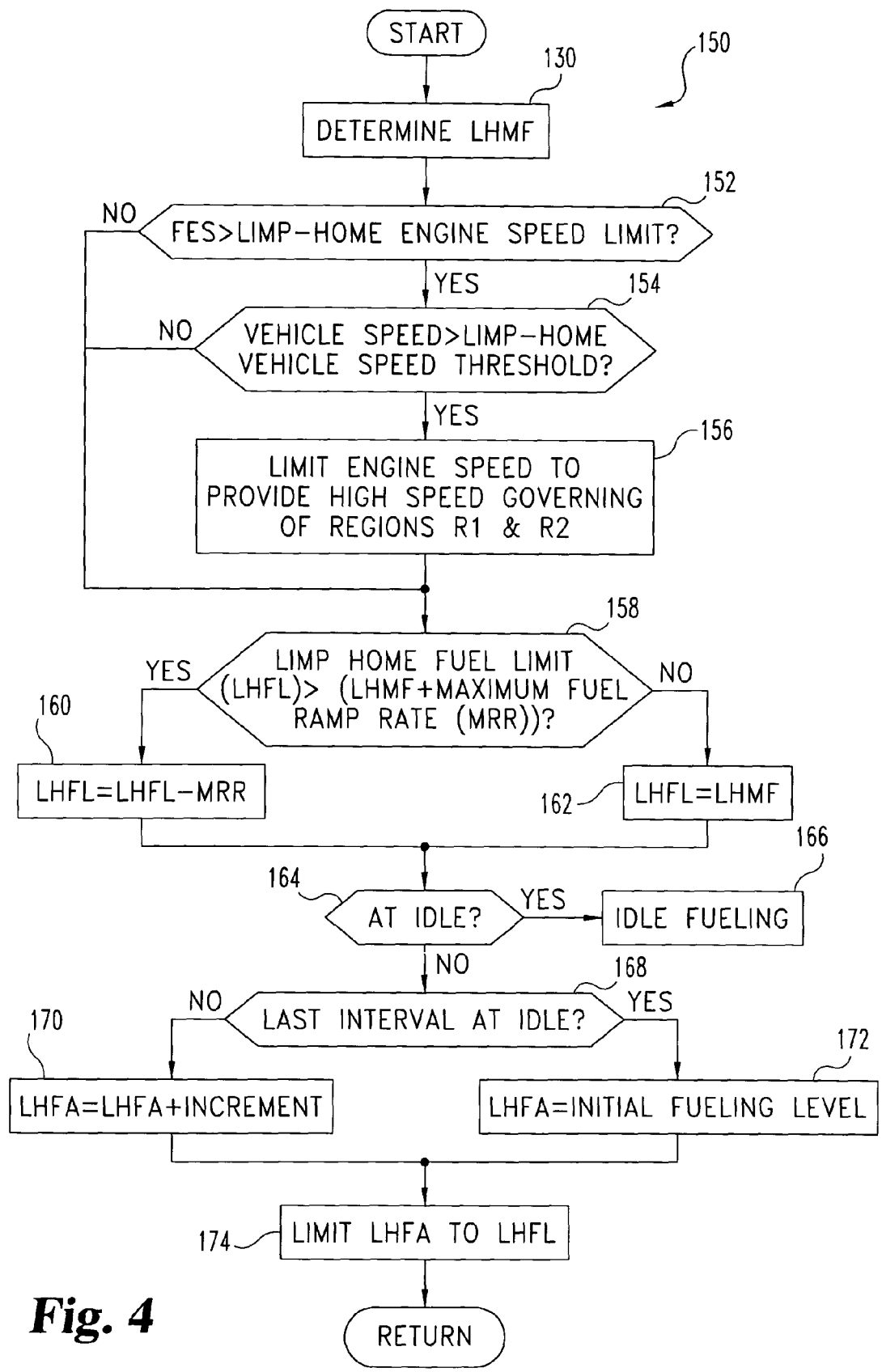

FIG. 4 is a flowchart describing the operation of subroutine 150 which begins with execution of subroutine 130 as was previously described in connection with FIG. 3. From subroutine 130, subroutine 150 proceeds to conditional 152 which tests whether the value of FES is greater than the value of a Limp Home Vehicle Engine Speed Limit (LHSL). If conditional 152 is negative, subroutine 150 proceeds to conditional 158 which is described below. If conditional 152 is affirmative, subroutine 150 proceeds to conditional 154 which tests whether the vehicle speed (VS) is greater than a Limp-Home Speed Threshold (LHST). VS may be determined from signal information communicated from vehicle speed sensor 94 to controller 90. If conditional 154 is negative, subroutine 150 proceeds to conditional 158 (described below). If conditional 154 is affirmative, subroutine 150 proceeds to operation 156.

Operation 156 regulates engine 30 in accordance with a limp-home engine speed governor in relation to regions R1, R2 and R4 shown in the graph of FIG. 5. If engine speed is determined to be in region R3 (a relatively high value), while vehicle speed is determined to be low, this governing relationship is not implemented, as might occur when the vehicle is in a low gear. Conversely, when VS is sufficiently high, speed governing results which provides an engine speed limit, and in conjunction with LHMF, limits vehicle speed to a level below what is typically permitted when the limp-home mode is not implemented. Because this governor only operates above a certain speed, it can be referred to as high speed governor (HSG). Referring to FIG. 5, there are two engine speed limiting lines for the governor, HSG1 and HSG2. HSG1 is the maximum engine speed line for the governor relative to fueling when "Brake On" is true. As a result, it should be understood that it forms a corner with the horizontal line corresponding to BMF. HSG2 is the maximum speed line for the governor relative to fueling when "Brake On" is false. HSG2 forms a corner with LMF. Operation along lines HSG1 and HSG2 subject to the respective fueling levels BMF and LMF serves to limit vehicle speed VS during the limp-home mode of operation in response to throttle control 110 compared to vehicle speed permitted during nominal operation. From operation 156, subroutine 150 proceeds to conditional 158.

Conditional 158 tests whether the value of Limp-Home Fueling Limit (LHFL) is greater than (LHMF+Maximum Fuel Ramp Rate (MRR)). If conditional 158 is negative, subroutine 150 proceeds to operation 162 which sets the value of LHFL equal to the value of LHMF (LHFL=LHMF). If conditional 158 is affirmative, subroutine 150 proceeds to operation 160 to decrease LHFL by MRR (LHFL=LHFL−MRR). From either operation 162 or operation 160, subroutine 150 proceeds to conditional 164.

Conditional 164 tests whether throttle control 110 is at an idle position. If conditional 164 is negative, subroutine 150 proceeds to conditional 168 (described below). If conditional 164 is affirmative, subroutine 150 proceeds to operation 166 which sets the fueling level at an idle fueling level as shown in connection with the graph of FIG. 5. Conditional 168 tests whether vehicle 20 was at idle during a prior execution (last interval) of subroutine 150, which is stored during each subroutine 150 execution.

If conditional 168 is negative, subroutine 150 proceeds to operation 170 which increases LHFA by an incremental value (LHFA=LHFA+INCREMENT). This incremental value may be an empirically determined value specific to engine 30 or to a class of engines to which engine 30 belongs and may be provided as a predefined stored value. If conditional 168 is affirmative, subroutine 150 proceeds to operation 172 which sets the value of LHFA equal an initial fueling level. From operations 172 and 170 subroutine 150 proceeds to operation 174, and then returns to routine 120.

Operation 174 limits LHFA to LHFL. In this manner, operation 174 provides a fueling limitation for engine 30. The limited LHFA is used to control engine 30 by communicating appropriate signal information from controller 90 to fueling subsystem 40. Fueling subsystem 40 may then, for example, control fuel injectors to regulate the amount of fuel provided to cylinders C1–C6.

Returning to FIG. 2, routine 120 proceeds from subroutine 150 to conditional 180 to determine if the failure condition has been removed by a reset action. If the value of conditional 180 is negative, routine 120 proceeds to operation 150. If the value of the conditional 180 is affirmative, routine 120 returns back to conditional 122, corresponding to a removal of the failure condition.

In certain embodiments, an operator may desire to operate vehicle 20 at a road speed greater than permitted with throttle control 110 during failure accommodation with subroutine 150. Cruise control 102 can be used as an alternative fueling control 100 to provide greater vehicle speeds for such embodiments. Typically, vehicle 20 needs to reach a minimum road speed as detected with sensor 92 before cruise control 102 is activated. The range of vehicle speeds provided during control of engine 30 with subroutine 150 in the limp-home mode can be selected to include such a minimum road speed when applicable. Accordingly, cruise control 102 can be activated once this minimum is reached to selectively increase vehicle speed to a level greater than permitted through the throttle control failure accommodation provided by subroutine 150. Nonetheless, in other embodiments, vehicle speed may not be significantly limited with routine 150, and/or it may be desirable to speed-limit cruise control 102 or render cruise control 102 inactive. In still other embodiments, cruise control 102 may be absent.

Figure 6:
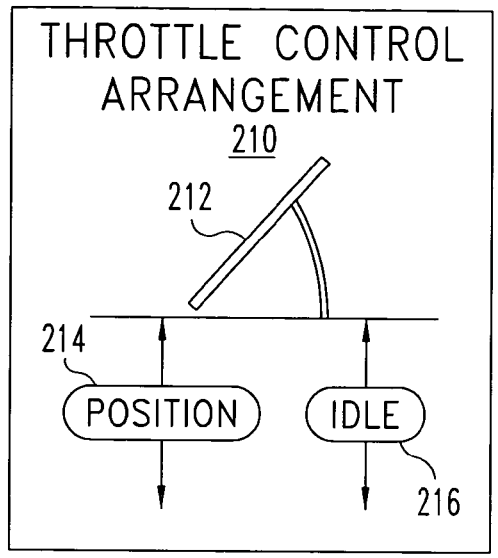
FIG. 6 is a diagrammatic view of one form of a throttle control arrangement to provide the throttle control in the system of FIG. 1.

FIG. 6 is one embodiment of a throttle control arrangement 210 that can be used as throttle control 110 and correspondingly with routine 120. An operator-adjustable pedal 212 is provided that may be positioned by the operator of vehicle 20 to command a certain throttle level. Arrangement 210 further includes position sensor 214 and idle sensor 216. Sensor 214 includes a rheostat or potentiometer with a movable member coupled to move in response to movement of pedal 212. A voltage is applied to sensor 214 to provide a changing output voltage at one of its terminals that corresponds to the pedal position. This output voltage is typically converted into a digital form. For implementation with routine 120, controller 90 could use the resulting signal to perform throttle adjustment operations and/or detect a throttle control failure for routine 120.

Idle sensor 216 can be in the form of a switch or other type of discrete signal indicating device responsive to a change in position of pedal 212 from idle. Switch 216 provides a corresponding two-state idle status signal with one state indicating an idle position of pedal 212 and the other state indicating a nonidle position of pedal 212. For implementation with routine 120, idle sensor 216 provides the idle status that can be used in the test of conditional 164 for subroutine 150.

Figure 7:
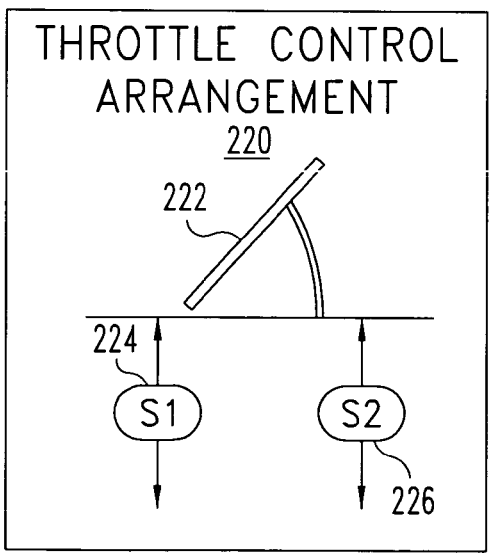
FIG. 7 is a diagrammatic view of an alternative form of a throttle control arrangement to provide the throttle control in the system of FIG. 1.

FIG. 7 depicts throttle control arrangement 220 of another embodiment that can be used as throttle control 110 and correspondingly with routine 120. An operator-adjustable pedal 222 is provided that may be positioned by the operator of vehicle 20 to command a certain throttle level. Arrangement 220 further includes dual pedal position sensors 224 and 226. Sensors 224 and 226 can each be the same as sensor 214 described in connection arrangement 210. Each sensor 224 and 226 has a separate voltage supply (not shown) to generate a pair of pedal position signals S1 and S2, respectively each representative of a range of different positions of pedal 222. For implementation with routine 120, controller 90 could use signals S1 and S2 to perform throttle adjustment operations an/or detect a throttle control failure for routine 120 as is further described in connection with FIGS. 8–11 hereinafter.

Sensors 214, 216, 224, and/or 226 may be calibrated and/or filtered with respect to known values, empirically determined values, and/or other algorithms to improve the functioning of throttle control 110. In other embodiments, sensors 214, 224, and/or 226 can be another type used with or without a rheostat, potentiometer, or other variable resistance element, such as: a capacitor or inductor that varies with pedal position, a device to indicate position based on orientation and/or strength of a magnetic field, a pedal position indicated in terms of sensed pressure, and optical position sensing device, a combination of these, and/or a different position sensing device as would occur to one skilled in the art. Additionally or alternatively, sensors that have a predefined number of discrete output levels can be arranged to detect different pedal positions. By way of nonlimiting example, a switch with several different positions and corresponding poles can be coupled to a resistive network to provide a different output voltage for each of its positions. By moving the switch actuator with the pedal, different pedal positions can represented by the different discrete voltages. Likewise, logic devices could be used with the different poles to generate a range of binary values corresponding to different pedal positions. In still other embodiments, in addition or as an alternative to a pedal, the operator-adjustable member of the throttle control can be a slider, a lever, a rotary dial, and/or a different input device type as would occur to one skilled in the art.

Figure 8:
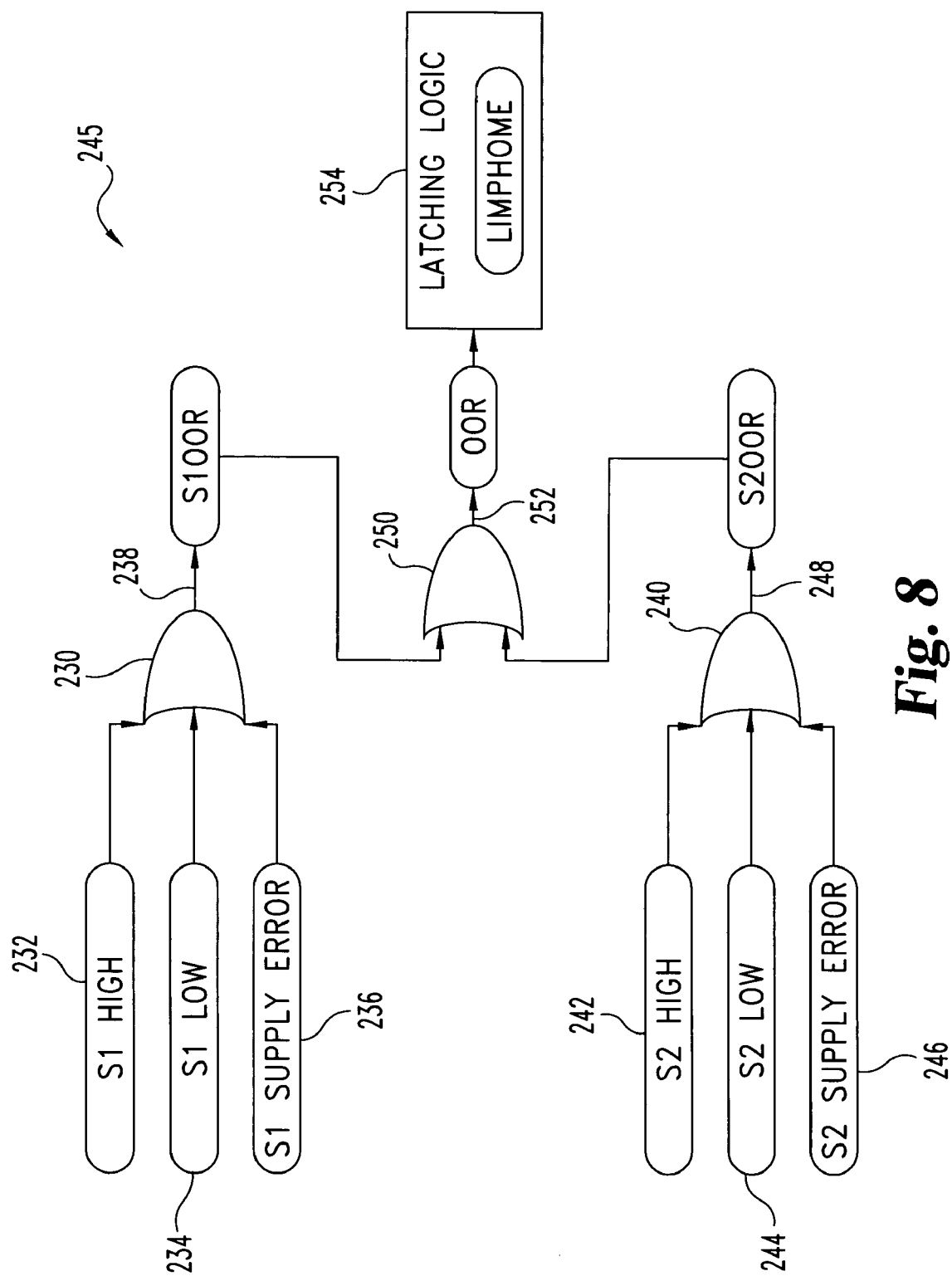
FIGS. 8–11 are control logic diagrams illustrating various operations involving the throttle control arrangement of FIG. 7.

FIGS. 8–11 depict different control logic diagrams associated with various operations that can be performed in accordance with the operating logic of controller 90 when arrangement 220 is used as throttle control 110. Control logic 245, 260, 300, and 400 of FIGS. 8–11, respectively, includes various operators, some of which have two-state (binary) inputs and/or outputs and others with inputs and/or outputs for which there are more than two states possible (>2 discrete values). Unless otherwise indicated, as used in FIGS. 8–11, OR operators, AND operators, inverters, debouncer signal inputs and outputs, latching logic, comparator outputs, conditional operators, and toggle inputs to logical switches are of the two-state type; and adders, multipliers, comparator inputs, minimum value selectors, absolute value operators, throttle range calculators, limiters, debouncer delay inputs, and input poles and outputs of logical switches are not. Referring specifically to FIG. 8, control logic 245 is depicted. Control logic 245 determines if a failure of sensor 224 or 226 has occurred. Logic 124 can be used to perform the test of conditional 122 in routine 120 to activate limp-home failure accommodation. Logic 245 includes logical OR operator 230 with three inputs 232, 234 and 236 and output 238. Input 232 indicates the value of signal S1 is out-of-range because its value is too high, input 234 indicates the value of signal S1 is out-of-range because its value is too low, and input 236 indicates a voltage supply error relating to the generation of signal S1 with sensor 224. The output 238 of logical OR operator 230 is true if one or more of the inputs 232, 234, or 236 is true. Output 238 provides two-state signal S1OOR.

Logic 245 also includes logical OR operator 240 with three inputs 242, 244 and 246 and output 248. Input 242 indicates the value of signal S2 is out-of-range because its value is too high, input 244 indicates the value of signal S2 is out-of-range because its value is too low, and input 246 indicates a voltage supply error relating to the generation of signal S2 with sensor 226. The output 248 of logical OR operator 240 is true if one or more of the inputs 242, 244, or 246 is true. Output 248 provides two-state signal S2OOR.

Logic 245 further includes logical OR operator 250 with output 252 and two inputs receiving signals S1OOR and S2OOR. If either or both of signals S1OOR or S2OOR is true, then output 252 is true—otherwise output 252 is false. Output 252 provides two-state signal OOR representing that a sensor out-of-range condition or sensor power supply failure condition has been detected. Logic 245 also includes latching logic 254 which sets the two-state signal LIMPHOME to true to indicate a limp-home condition if signal OOR is true. If later an idle position of pedal 222 is determined and OOR is false, then logic 254 sets LIMPHOME to false.

Figure 9:
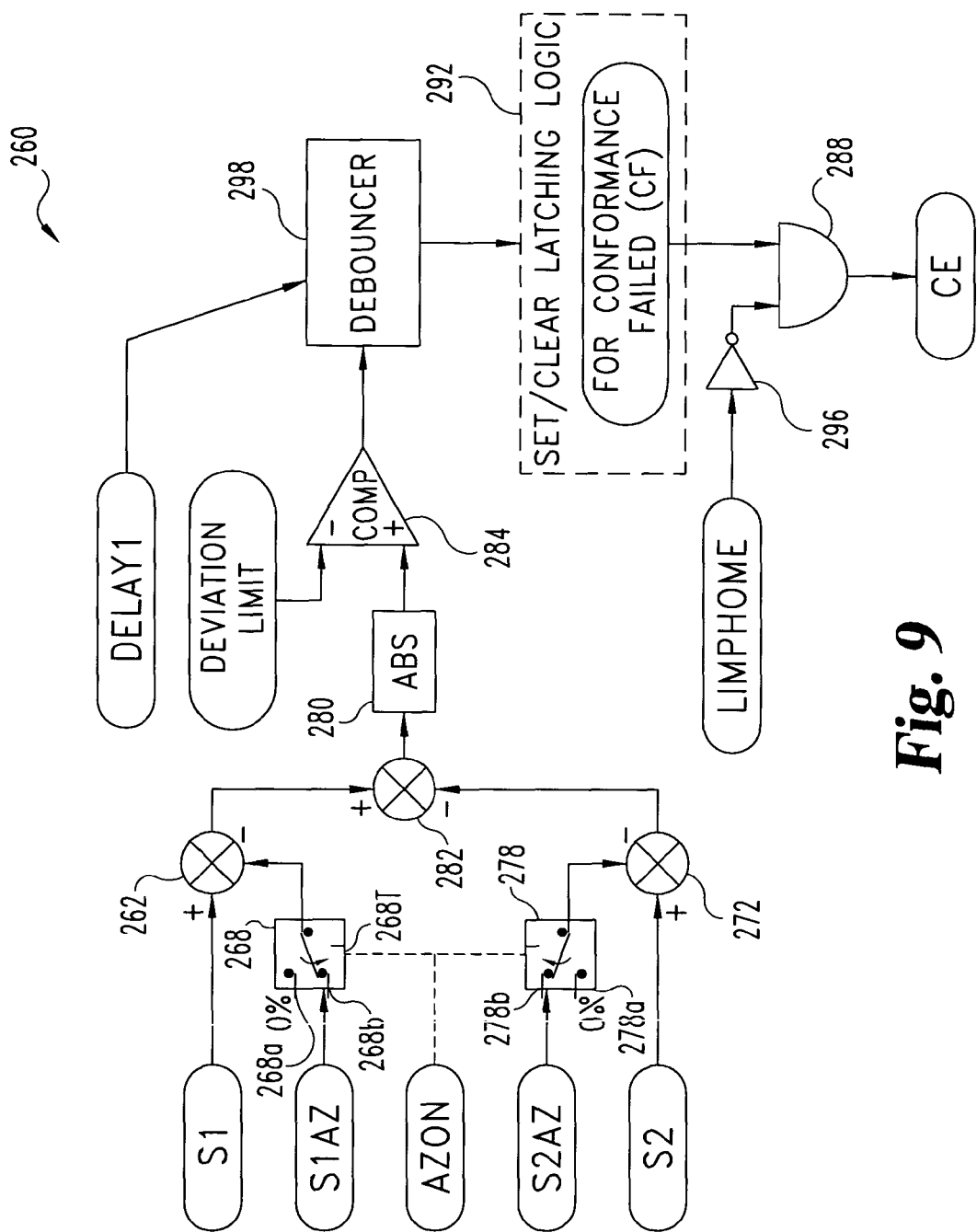

FIG. 9 illustrates control logic 260 which may be used to verify conformance between sensors 224 and 226. Logic 260 includes adders 262, 272 and 282 each including a positive input (+), a negative input (−) and an output indicated by the departing arrow head, and logical switches 268 and 278. Adders 262, 272 and 282 subtract the value at their negative input from the value at their positive input and output the resulting value. The positive input of adder 262 is connected to signal S1. The negative input of adder 262 is connected to the output of logical switch 268. Similarly, the positive input of adder 272 is connected to signal S2, and the negative input of adder 272 is connected to the output of logical switch 278. The output of adder 262 is connected to the positive input of adder 282 and the output of adder 272 is connected to the negative input of adder 282. Thus adder 282 outputs a value corresponding to the value output from adder 262 less the value output from adder 272.

Switch 268 includes two input poles: zero input 268a and auto-zero input 268b receiving signal S1AZ. Signal S1AZ is an automatic zeroing value for signal S1 to account for sensor manufacturing variation and drift that might occur, for example, due to wear or environment. Switch 278 includes two input poles: zero input 278a and auto-zero input 278b receiving signal S2AZ. Signal S2AZ is an automatic zeroing value for signal S2. The generation of signals S1AZ and S2AZ is further described in connection with the logic of FIG. 11 hereinafter.

Switches 268 and 278 each includes a respective toggle input indicated by a phantom line input arrow connected to two-state signal AZON. When signal AZON is true, switches 268 and 278 make contact with the pole in the direction of the curved arrows within the switch symbols to transmit signals S1AZ and S2AZ to the respective adders 262 and 272. In other words, signal AZON turns-on the autozero function providing S1AZ and S2AZ to adders 262 and 272. If AZON is false, the 0% values on inputs 268a and 278a are transmitted through switches 268 and 278 to adders 262 and 272, respectively. As a result, adders 262 and 272 pass signals S1 and S2 through to adder 282 without auto zero adjustment. Accordingly, adder 282 outputs a difference between S1 and S2 without autozeroing when AZON is false, and with autozeroing when AZON is true.

Logic 260 further includes absolute value operator 280 which outputs the absolute value or unsigned magnitude of its input, comparator 284 which provides a true binary output if its positive (+) input is larger than its negative (−) input (otherwise the output is false), a logical debouncer 298 which generates a debounced binary signal, and latching logic 292. Operator 280 outputs the absolute value of the difference value generated by adder 282. The output of operator 280 is provided to the positive input of comparator 284, and a DEVIATION LIMIT signal is provided to the negative input of comparator 284. The DEVIATION LIMIT is a constant representing a threshold which, if exceeded by the difference between the outputs of adders 262 and 272, results in a positive output of comparator 284. Otherwise, the output of comparator 284 is false. In this manner control system 260 operates to determine whether two sensor output values or two autozeroed sensor values are within a desired range of one another.

The output of comparator 284 is provided to debouncer 298. Debouncer 298 delays a transition from a false to a true state by delay constant DELAY1, which could span several executions of logic 260. In other words, a true output of comparator 284 has to be sustained for a period of time greater than or equal to that represented by constant DELAY1 before the output of debouncer 298 changes from a false state to a true state.

The output of debouncer 298 is provided to latching logic 292. If this output is true, logic 292 sets the logical conformance failed signal CF to true. If, after a period of time, the output of debouncer 298 returns to false, and S1 is less than or equal to S1AZ and S2 is less than or equal to S2AZ, then signal CF is reset to false. Thus, the aspects of logic 260 described to this point permit indication of a conformance failure relating to S1 and S2 and correspondingly sensors 224 and 226.

Logic 260 also includes a two-input logical AND operator 288 and logical inverter 296. Inverter 296 provides its inverted output to one of the inputs of operator 288. Signal CF is provided to the other input of operator 288 from logic 292. Signal LIMPHOME is input to inverter 296. As a result, the output of operator 288, signal CE, is true only if CF is true and LIMPHOME is false. In this manner, logic 260 only indicates a conformance error by making signal CE true when limp-home is not active (LIMPHOME=true).

Figure 10:
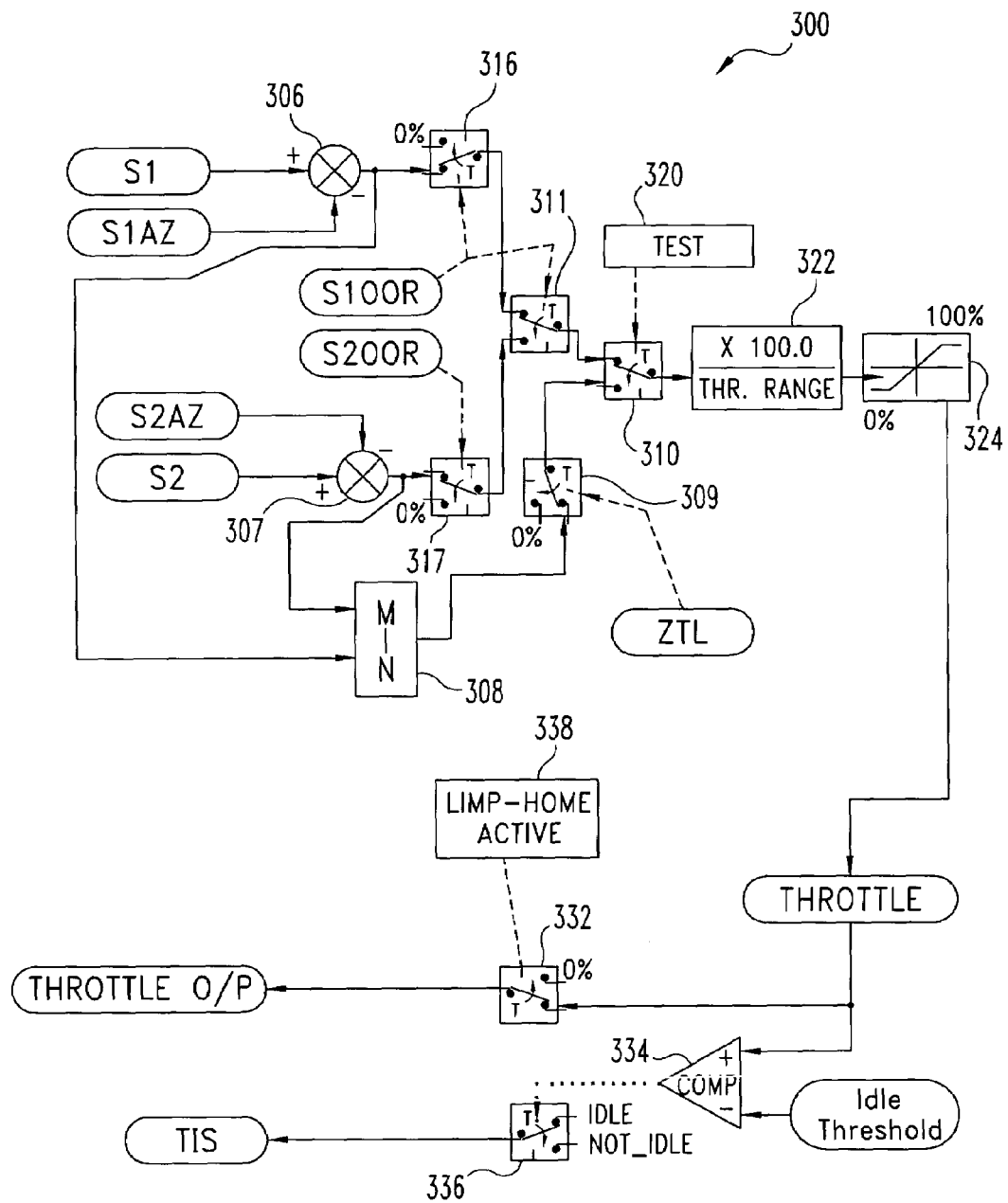

FIG. 10 shows control logic 300 which outputs a throttle control value in the form of signal THROTTLE O/P and idle status of the throttle in the form of signal TIS. When arrangement 220 is functioning properly, signal THROTTLE O/P can serve as the primary operator throttle input. Signal TIS can be utilized to determine throttle idle/nonidle status to execute conditional 164 of subroutine 150.

Logic 300 includes inputs S1, S1AZ, S2 and S2AZ previously described in connection with FIG. 9. Inputs S1 and S1AZ are connected to the positive (+) and negative (−) inputs of adder 306. Inputs S2 and S2AZ are connected to the positive (+) and negative (−) inputs of adder 307. Adders 306 and 307 each output the difference provided by subtracting the value at its negative input from the value at its positive input.

The output of adder 306 is connected to one input pole of logical switch 316 and to one input of minimum value selector (MIN) 308. The output of adder 307 is connected to one input pole of logical switch 317 and to a second input of selector 308. Selector 308 outputs the lesser of the two input values that it receives. Switches 316 and 317 each also include a second input pole of zero (0%), and a toggle control input T that causes the respective switch output to provide the second input value of zero when at a logical "true" state. For switches 316 and 317, the toggle signals are provided as signals S1OOR and S2OOR, respectively, as previously described in connection with FIG. 8.

Logic 300 also includes logical switch 311 with one of its input poles connected to the output of switch 316 and another input pole connected to the output of switch 317. Switch 311 also includes a toggle control input T coupled to signal S1OOR that causes switch 311 to output the value from switch 316 when it receives a false logical input, and to output the value from switch 317 when it receives a true logical input. Recalling that signals S1OOR and S2OOR are true when an error condition is determined in connection with their respective sensors 224 and 226, it should be understood switches 306, 307, and 311 cooperate to output the value provided by adder 306 when both signals S1OOR and S2OOR are true, to output the value from the sensor without the failure when only one of signals S1OOR and S2OOR is true, and to output the zero input of switch 316 when both signals S1OOR and S2OOR are true.

Logic 300 also includes logical switches 309 and 310. Selector 308 provides the lesser of its two inputs to one input pole of switch 309 which represents the autozeroed values of signals S1 and S2 regardless of whether an out-of-range condition has occurred in connection with either one. Switch 309 also includes a second input pole of zero (0%) and toggle control input T that is determined by a logical constant ZTL. Switch 309 provides its output to one input pole of switch 310 and the other input pole of switch 310 is provided the output of switch 311. Switch 310 has a toggle control input T provided from test logic 320. Test logic 320 outputs a true logic state only if signal CF produced by logic 260 is true and signal LIMPHOME produced by logic 245 is false. Switches 309 and 310 cooperate so that the output of switch 310 comes from switch 311 unless there is conformance failure without a limp-home indication. On the other hand, if CF is true and LIMPHOME is false, then switch 310 outputs the value provided by switch 309 as determined by the ZTL constant. Accordingly, if constant ZTL is true, it causes a zero value to be output by switch 310 if there is a conformance failure (CF=true) and no limp-home indication (LIMPHOME=false). If ZTL is false with CF=true and LIMPHOME=false, then the minimum value from selector 308 is output by switch 310. In this manner, constant ZTL can be used to determine whether values from sensor 224 and/or sensor 226 causing a conformance failure without a limp-home activation are to be relied upon.

Logic 300 also includes throttle range calculator 322, limiter 324, comparator 334, logical switches 332 and 336, and limp home active logic 338. The output of switch 310 is connected to calculator 322 which multiplies its input by 100 and divides by a constant corresponding to the expected throttle range to produce a normalized throttle level output in terms of percentage. This output is limited to a range of 0% to 100% by limiter 324; where any input value outside this range (<0% or >100%) is output by limiter 324 as the nearest of the two range extremes of 0% and 100%. The limiter output is designated as signal THROTTLE which is provided to a positive input of comparator 334 and one of two input poles of switch 332. The negative input of comparator 334 is a constant representative of a threshold idle value. If the positive input of comparator 334 is greater than the negative input, then it outputs a logical true state causing the toggle input T of switch 336 to change its output (throttle idle status signal TIS) from an idle indicating state to a nonidle indicating state. Switch 332 changes its output (signal THROTTLE O/P) from signal THROTTLE to zero in response to a logical true at its toggle input T from logic 338. Logic 338 outputs a logical true state only if: (a) CF is true and LIMPHOME is false, or (b) LIMPHOME is true and neither is S1AZ below a predetermined level nor is S2 out-of-range because it is too low.

Figure 11:
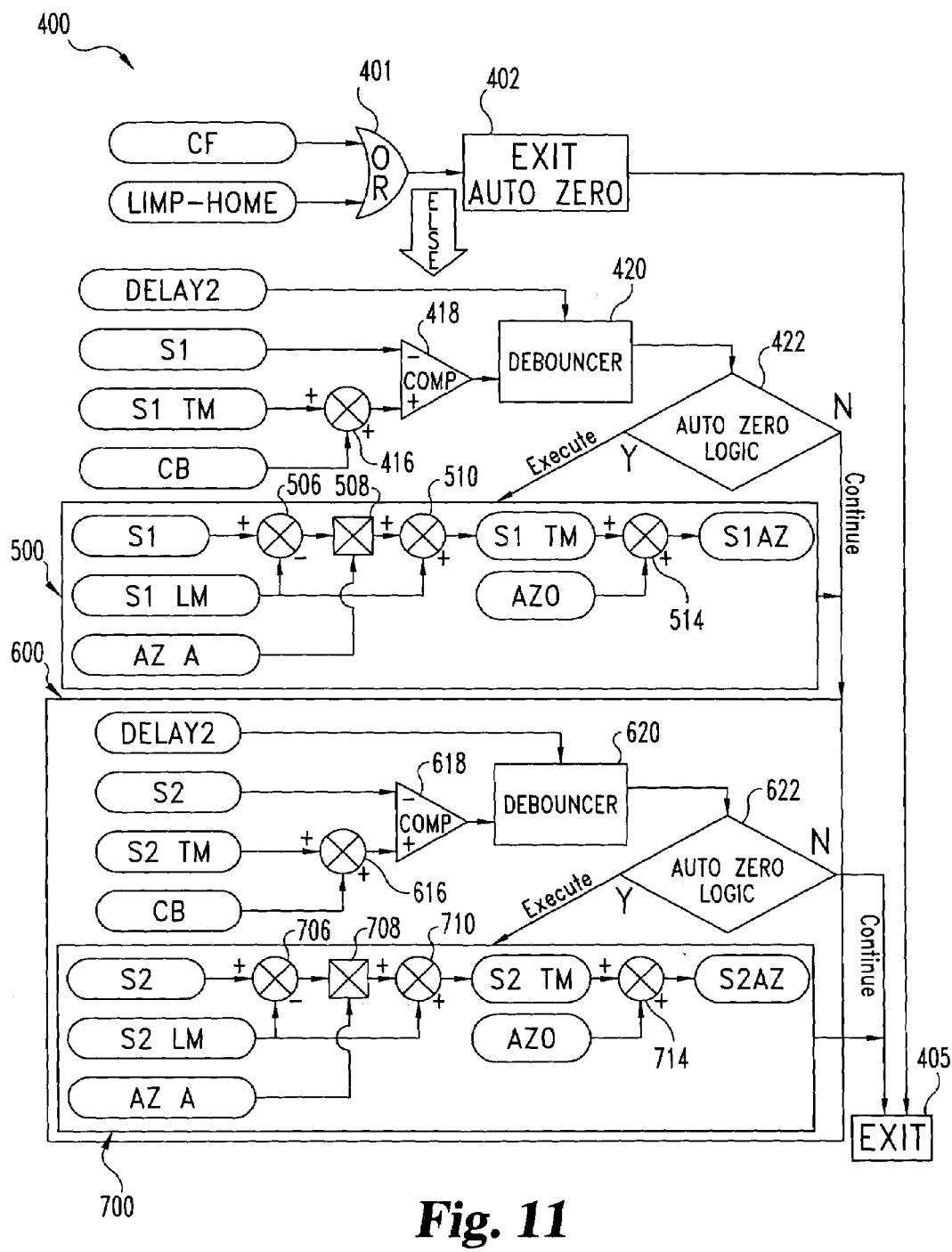

FIG. 11 shows auto-zero logic 400. Logic 400 includes logical OR operator 401 with signals CF and LIMPHOME as inputs. If either input CF or LIMPHOME is true, a logic true state is output by operator 401 to operators 402 and 405. In response, further autozero processing in accordance with logic 400 is bypassed, and logic 400 is exited. Otherwise, autozero logic is processed further which is described as follows.

Logic 400 also includes adder 416, comparator 418, debouncer 420, conditional operator 422, logic grouping 500 and logic grouping 600. Adder 416 sums a minimum throttle adjustment factor designated by signal S1 TM and a sensor confidence band constant designated by signal CB, and provides this sum to the positive input of comparator 418. The negative input of comparator 418 is signal S1. Comparator 418 outputs a true logic state if the sum of S1 TM and CB (S1 TM+CB) is greater than S1, otherwise its output is set to a logic false state. This output is debounced with debouncer 420 using the constant DELAY2 as previously described for debouncer 298 of logic 260. The logical output of debouncer 420 is tested by conditional operator 422, which if true (affirmative) branches to logic grouping 500 and if false (negative) branches to logic grouping 600.

Logic grouping 500 includes adders 506, 510, and 514; and multiplier 508. The throttle minimum value for S1 previously designated signal S1 TM is calculated by logic grouping 500 as a function of signal S1, a sensor property autozero adjustment factor designated by signal AZ A, and a previously calculated value of S1 TM, which is designated signal S1 LM. Signal S1 LM is a stored value of S1 TM from the last execution of logic group 500, or an initialization value if there were no previous executions. Adder 506 subtracts signal S1 LM from signal S1 and provides the resulting difference to multiplier 508. Multiplier 508 multiplies this difference by the adjustment factor of signal AZ A and provides the resulting product to adder 510. Adder 510 adds the product from multiplier 508 and signal S1 LM, which sum becomes the current S1 TM signal. Adder 514 adds signal S1 TM and an auto-zero offset constant AZO to provide the autozero signal S1AZ used with previously described logic of FIGS. 9 and 10.

Logic 400 continues with logic grouping 600 from logic grouping 500 or the false (negative) branch of conditional operator 422. Logic grouping 600 includes adder 616, comparator 618, debouncer 620, conditional operator 622 and logic subgrouping 700. Adder 616 sums a minimum throttle adjustment factor for signal S2, designated signal S2 TM, and signal CB, and provides this sum to the positive input of comparator 618. The negative input of comparator 618 is signal S2. Comparator 618 outputs a true logic state if the sum of S2 TM and CB (S2 TM+CB) is greater than S2, otherwise its output is set to a logic false state. This output is debounced with debouncer 620 using the constant DELAY2 as previously described for debouncer 298 of logic 260. The logical output of debouncer 620 is tested by conditional operator 622, which if true (affirmative) branches to logic subgrouping 700 and if false proceeds to operator 405 to exit.

Logic subgrouping 700 includes adders 706, 710, and 714; and multiplier 708. The throttle minimum value for S2 (signal S2 TM) is calculated by logic subgrouping 700 as a function of signal S2, a sensor property autozero adjustment factor designated by signal AZ A, and a previously calculated value of S2 TM, which is designated signal S2 LM, in the same manner as described for signal S1 of logic grouping 500. Signal S2 LM is a stored value of S2 TM from the last execution of logic subgrouping 700, or an initialization value if there were no previous executions. Adder 706 subtracts signal S2 LM from signal S2 and provides the resulting difference to multiplier 708. Multiplier 708 multiplies this difference by the adjustment figure of signal AZ A and provides the resulting product to adder 710. Adder 710 adds the product from multiplier 708 and signal S2 LM, which sum becomes current S2 TM signal. Adder 714 adds signal S2 TM and constant AZO to provide the autozero signal S2 AZ used with previously described logic of FIGS. 9 and 10. From logic subgrouping 700, operator 405 is encountered at which point logic 500 is exited.

It should be understood that routine 120; subroutines 130 and 150; and control logic 245, 260, 300, or 400 are each typically executed by controller 90 on a repetitive basis either continuously or with time intervals lapsing between executions. Such time intervals could be generally the same from one to the next or vary in duration. Alternatively or additionally, some or all of these routines, subroutines, and logic may be commenced, terminated and/or suspended by interrupts. Additionally, it may be necessary to ensure a particular order for the execution of certain routines, subroutines, and/or logic where one depends on another for one or more variables. Accordingly, execution may be scheduled by controller 90 in a predetermined sequence timed as required to implement the invention. In one embodiment, certain routines, subroutines, and logic are periodically scheduled for execution at a frequency that is different than the periodic scheduling of other of the routines, subroutines, and logic.

As used herein, it should be appreciated that: variable, criterion, characteristic, quantity, amount, value, constant, flag, data, record, threshold, limit, input, output, matrix, command, and look-up table, each generally correspond to one or more signals within processing equipment of the present invention. It is contemplated that various functional blocks, operators, operations, stages, conditionals, procedures, thresholds, and processes described in connection with the present invention could be altered, rearranged, substituted, deleted, duplicated, combined, or added as would occur to those skilled in the art without departing from the spirit of the present invention.

All publications, patent, and patent applications cited in this specification are herein incorporated by reference as if each individual publication, patent, or patent application were specifically and individually indicated to be incorporated by reference and set forth in its entirety herein. Any theory of operation or finding described herein is merely intended to provide a better understanding of the present invention and should not be construed to limit the scope of the present invention as defined by the claims that follow to any stated theory or finding. While the invention has been illustrated and described in detail in the drawings and foregoing description, the same is to be considered as illustrative and not restrictive in character, it being understood that only the preferred embodiment has been shown and described and that all changes, modifications, and equivalents that come within the spirit of the invention as defined herein or by the following claims are desired to be protected.

What is claimed is:

1. A method, comprising:
    operating an internal combustion engine in response to a throttle signal provided with an operator-adjusted throttle control;
    generating an idle status signal corresponding to an idle position of the operator-adjusted throttle control;
    detecting a failure of the throttle signal; and
    incrementally adjusting an amount of fuel provided to the engine as a function of the idle status signal and the rotational speed of the engine in response to the failure.

2. The method of claim 1, which includes powering a ground traveling vehicle with the engine and sensing brake status of the vehicle and wherein said incrementally adjusting includes determining the amount of fuel as a function of the brake status.

3. The method of claim 2, wherein said incrementally adjusting includes determining the amount of fuel as a function of a vehicle speed value.

4. The method of claim 1, wherein the throttle control includes an operator adjustable pedal and a sensor to provide the throttle signal and a switch corresponding idle position of the pedal to provide the idle status signal.

5. The method of claim 1, wherein the throttle control includes an operator adjustable pedal and a set of rotary sensors to determine the throttle signal and the idle status signal.

6. The method of claim 1, which includes fueling the engine after the failure in response to an operator fueling control different from the throttle control.

7. The method of claim 1, which includes:
powering motion of the vehicle with the engine;
increasing speed of the vehicle by increasing the fuel amount provided by said incrementally adjusting in response to a nonidle position of the throttle control being indicated by the idle status signal; and
decreasing speed of the vehicle by reducing the fuel amount provided by said incrementally adjusting in response to an idle position of the throttle control being indicated by the idle status signal.

8. The method of claim 4, which includes:
regulating the engine in accordance with an engine speed governor when a vehicle speed exceeds a predefined threshold.

9. A method, comprising:
moving a ground traveling vehicle with an internal combustion engine in response to a first operator-adjusted fueling control;
detecting a failure of the first operator-adjusted fueling control;
after the failure, adjusting operation of the engine in response to the first operator-adjusted fueling control to limit vehicle speed; and
operating the engine after the failure in response to a second operator-adjusted fueling control to selectively move the vehicle at a greater speed than permitted with the first operator-adjusted fueling control.

10. The method of claim 9, wherein the first operator-adjusted fueling control includes a throttle control arrangement with a pedal and at least one sensor to sense a range of nonidle positions of the pedal.

11. The method of claim 9, wherein the second operator-adjusted fueling control includes a cruise control for a vehicle.

12. The method of claim 9, wherein said adjusting includes fueling the engine after the failure in response to the first operator-adjusted fueling control in accordance with an idle status indication and rotational engine speed.

13. An apparatus, comprising:
a ground traveling vehicle;
an internal combustion engine operable to power motion of the vehicle;
a throttle control responsive to an operator of the vehicle;
a cruise control responsive to the operator of the vehicle;
a vehicle speed sensor; and
a controller responsive to the throttle control to regulate fueling of the engine, the controller being operable to detect a throttle control failure and regulate engine operation with the throttle control in an accommodation mode in response to the failure, the controller being responsive to operator input with the cruise control and the vehicle speed sensor to permit the engine to power the vehicle at a speed greater than with the throttle control during the engine operation in the accommodation mode.

14. The apparatus of claim 13, wherein the throttle control includes an operator adjustable pedal and means for sensing position of the pedal.

15. The apparatus of claim 13, wherein the throttle control includes a set of sensors redundantly registering a range of nonidle positions of an operator adjustable pedal.

16. The apparatus of claim 13, wherein the controller includes a signal corresponding to a maximum vehicle speed in response to the throttle control while operating in the accommodation mode.

17. The apparatus of claim 16, wherein the controller includes means for performing the accommodation mode as a function of rotational speed of the engine, brake status of the vehicle, and idle status of the vehicle.

18. A method, comprising:
operating a vehicle including an internal combustion engine fueled in accordance with an operator-adjusted throttle control;
registering at least a portion of a range of multiple nonidle positions of the operator-adjusted throttle control with each of two or more sensors;
detecting a failure of one of the sensors;
determining an idle status of the throttle control after the failure; and
fueling the engine based on a limp-home mode of operation in accordance with the idle status and the rotational speed of the engine.

19. The method of claim 18, wherein the limp-home mode of operation includes determining said fueling as a function of the idle status, rotational speed of the engine, and brake status of the vehicle.

20. The method of claim 18, which includes operating the vehicle at a speed greater than permitted by the limp-home mode of operation in response to activation of a cruise control by an operator.

21. The method of claim 18, wherein the limp-home mode of operation includes increasing speed of the vehicle by incrementally increasing fuel provided to the engine during a nonidle position of the throttle control indicated by the idle status and decreasing the speed of the vehicle by reducing the fuel for an idle position of the throttle control indicated by the idle status.

22. The method of claim 18, which includes regulating the engine in accordance with a speed governor when vehicle speed exceeds a predetermined threshold.

23. An apparatus, comprising:
an internal combustion engine;
a throttle control arrangement including an operator adjustable pedal and a set of sensors to redundantly sense at least a portion of a range of multiple nonidle positions of the pedal; and
a controller responsive to the set of sensors to determine a engine fueling signal corresponding to position of the pedal and an idle status signal representative of idle position status of the pedal, the controller being operable to detect a failure of the throttle control arrangement and control the engine in a failure accommodation mode in response, the controller generating the engine fueling signal as a function of the idle status signal and the rotational speed of the engine during the failure accommodation mode of operation.

24. The apparatus of claim 23, further comprising:
a vehicle carrying the engine, the throttle control, and the controller, the engine powering motion of the vehicle;

an operator adjustable cruise control to select a desired cruise speed of the vehicle;

wherein said controller is responsive to an operator input provided with the cruise control to permit the engine to power the vehicle at a greater speed than with the throttle control during the control of the engine in the failure accommodation mode.

25. The apparatus of claim 23, further comprising a vehicle carrying the engine, the throttle control, and the controller; and wherein the controller includes means for performing the accommodation mode as a function of rotational speed of the engine and brake status of the vehicle.

26. An apparatus, comprising:
   an internal combustion engine for powering a ground traveling vehicle;
   a throttle control arrangement including means for sensing position of an operator adjustable pedal to provide a throttle control signal;
   a first sensor to sense rotational speed of the engine;
   a second sensor to sense brake status of the vehicle;
   means for determining a failure of the throttle control signal; and
   means for operating the engine in a limp-home mode in response to the failure, said operating means including means for fueling the engine during the limp-home mode of operation in accordance with idle position of the pedal, the rotational speed of the engine, and the brake status.

* * * * *